(12) United States Patent
Kim et al.

(10) Patent No.: US 8,492,306 B2
(45) Date of Patent: Jul. 23, 2013

(54) METHOD AND APPARATUS FOR PREPARING A CATALYST

(75) Inventors: Chang H. Kim, Rochester, MI (US); Michelle H. Wiebenga, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/252,235

(22) Filed: Oct. 4, 2011

(65) Prior Publication Data

US 2013/0085063 A1   Apr. 4, 2013

(51) Int. Cl.
*B01J 23/28* (2006.01)

(52) U.S. Cl.
USPC ...................................................... 502/330

(58) Field of Classification Search
USPC ...................................................... 502/330
See application file for complete search history.

(56) References Cited

U.S. PATENT DOCUMENTS

| | | |
|---|---|---|
| 4,048,096 A | 9/1977 | Bissot |
| 4,113,658 A | 9/1978 | Geus |
| 4,657,888 A | 4/1987 | Mesters et al. |
| 5,208,203 A | 5/1993 | Horiuchi |
| 5,628,975 A | 5/1997 | Horiuchi |
| 6,685,900 B2 | 2/2004 | Domesle |
| 6,821,923 B1 | 11/2004 | Kuperman et al. |
| 7,745,367 B2 | 6/2010 | Fujdala |
| 2005/0135995 A1* | 6/2005 | Wang ........................ 423/625 |
| 2009/0056320 A1 | 3/2009 | DaCosta |
| 2010/0048384 A1 | 2/2010 | Fujdala |
| 2010/0184587 A1 | 7/2010 | Hao |

FOREIGN PATENT DOCUMENTS

| | | |
|---|---|---|
| WO | WO2008088649 A1 | 7/2008 |
| WO | WO2008117941 A1 | 10/2008 |

OTHER PUBLICATIONS

Jiao, Ling.;The synthesis of highly dispersed noble and base metals on silica via strong electrostatic adsorption: I. Amorphous silica; J. Catalysis 260(2008)329-341 www.elsevier.com.

* cited by examiner

*Primary Examiner* — Colleen Dunn
*Assistant Examiner* — Haytham Soliman

(57) ABSTRACT

A method for preparing a catalyst includes preparing a first solution including a gold precursor and a palladium precursor, preparing an alumina suspension, heating the alumina suspension to a preferred temperature range, introducing the first solution to the alumina suspension and coincidently maintaining the pH of a resulting solution at a preferred pH level, separating solids in the resulting solution, and calcining the separated solids to form a catalyst including gold and palladium co-deposited onto alumina.

11 Claims, 3 Drawing Sheets

METHOD AND APPARATUS FOR PREPARING A CATALYST

TECHNICAL FIELD

This disclosure is related to catalysts, and more specifically related to methods for preparing catalysts for use in exhaust gas feedstreams of internal combustion engines.

BACKGROUND

The statements in this section merely provide background information related to the present disclosure. Accordingly, such statements are not intended to constitute an admission of prior art.

Catalytic converter devices are employed in exhaust systems of internal combustion engines to promote oxidation or reduction of combustion products in an exhaust gas feedstream. Catalytic converter devices employ metallic or ceramic support substrates on which washcoat materials including catalysts may be applied. Catalysts include catalytic materials preferably combined with catalyst support materials. Catalytic materials include platinum-group metals of platinum, palladium, rhodium, gold and silver, and base metals including iron, copper, tin, and others. Catalyst support materials include alumina, e.g., Al2O3 and zeolite, e.g., SiC.

Processes for preparing catalysts include such steps as preparing materials containing catalytic materials, adding catalytic materials to a solution containing catalyst support materials, and precipitating out a resultant catalyst that may be calcined.

Materials in the form of a washcoat slurry containing the calcined catalyst may be applied to a substrate by immersion or another suitable method. The resulting coated substrate may be calcined for a period of time to prepare a finished product suitable for assembly into a catalytic converter assembly.

Compression-ignition and lean-burn spark-ignition engines operate at relatively low exhaust gas temperatures, often near 200° C., with corresponding need to have exhaust aftertreatment devices that are configured to operate at such temperature ranges.

SUMMARY

A method for preparing a catalyst includes preparing a first solution including a gold precursor and a palladium precursor, preparing an alumina suspension, heating the alumina suspension to a preferred temperature range, introducing the first solution to the alumina suspension and coincidently maintaining the pH of a resulting solution at a preferred pH level, separating solids in the resulting solution, and calcining the separated solids to form a catalyst including gold and palladium co-deposited onto alumina.

BRIEF DESCRIPTION OF THE DRAWINGS

One or more embodiments will now be described, by way of example, with reference to the accompanying drawings, in which.

DETAILED DESCRIPTION

Figure 1:
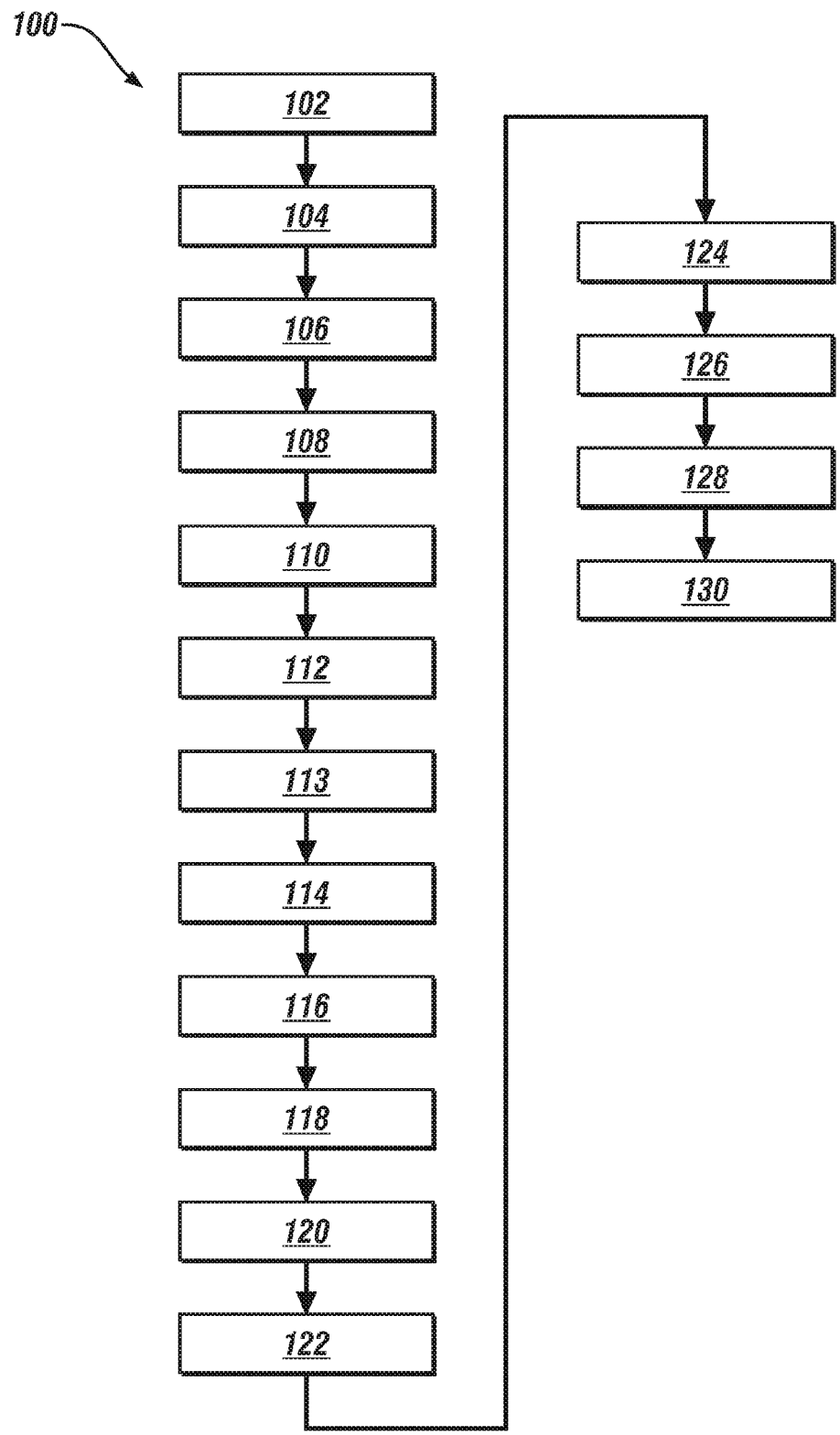
FIG. 1 schematically shows a pH-normalized co-deposition and precipitation process in flowchart form for preparing a catalyst employable in a catalytic converter, in accordance with the disclosure.

Referring now to the drawings, wherein the showings are for the purpose of illustrating certain exemplary embodiments only and not for the purpose of limiting the same, FIG. 1 schematically shows a pH-normalized co-deposition and precipitation process 100 in flowchart form for preparing a catalyst employable in a catalytic converter.

A catalytic converter includes an insulated metallic support structure that contains a substrate coated with a catalyst. The coated substrate is manufactured by washcoating a substrate with a slurry containing a catalyst that includes catalytic materials and catalyst support materials.

The process 100 is a pH-normalized co-deposition and precipitation process, which may be employed to prepare Au—Pd/alumina catalyst. Table 1 is provided as a key to FIG. 1 wherein the numerically labeled blocks and the corresponding functions are set forth as follows.

TABLE 1

| BLOCK | BLOCK CONTENTS |
|---|---|
| 102 | Prepare Au precursor: $HAuCl_4*3H_2O$<br>Prepare palladium precursor: $Pd(NO_3)_2$ in nitric acid |
| 104 | Add $H_2O$ to Au precursor |
| 106 | Add palladium precursor to $H_2O$ with Au precursor |
| 108 | Dilute with $H_2O$ to form Au—Pd solution |
| 110 | Prepare alumina suspension by mixing $H_2O$ and $Al_2O_3$; heat to 45-60° C. while stirring |
| 112 | Monitor pH of alumina suspension |
| 113 | Normalize alumina suspension to a pH of 7.0 prior to adding the Au—Pd solution |
| 114 | Add Au—Pd solution in drop-wise manner to alumina suspension while heating and stirring |
| 116 | Monitor pH of alumina suspension with added Au—Pd solution |
| 118 | Add $Na_2CO_3$ to alumina suspension with added Au—Pd solution to maintain a pH of 7 +/− 0.1 |
| 120 | Stir and maintain solution containing alumina suspension with added Au—Pd at constant temperature |
| 122 | Allow solution containing alumina suspension with added Au—Pd to stand |
| 124 | Precipitate solids from solution containing alumina suspension with added Au—Pd |
| 126 | Wash solids with $H_2O$ |
| 128 | Dry, crush, and calcine precipitated solids containing Au—Pd and $Al_2O_3$ to form Au—Pd/alumina catalyst |
| 130 | Apply Au—Pd/$Al_2O_3$ catalyst to substrate by washcoating |

The process 100 for pH-normalized co-deposition and precipitation of Au—Pd/$Al_2O_3$ includes preparing a solution at a 2:1 Pd:Au wt. ratio in one embodiment, e.g., containing 1.492 wt % Pd and 0.746 wt % Au. This includes preparing a gold (Au) precursor, e.g., $HAuCl_4*3H_2O$, and preparing a palladium (Pd) precursor, e.g., $Pd(NO_3)_2$ in nitric acid (102). It is appreciated that another suitable Pd:Au wt. ratio may be employed.

Water is added to the Au precursor. The amount of water added is such that after adding a desired mass of the Pd precursor the $HAuCl_4*3H_2O$ makes up 1% of the mass wt. of a resulting Au—Pd solution (104).

The Pd precursor is added to prepare the Au—Pd solution in a mass amount that achieves the 2:1 Pd:Au wt. ratio (106). The Au—Pd solution is diluted with a suitable amount of water (108).

An alumina suspension is prepared by adding a mass of alumina to water, which is then heated to 45-60° C. while being continuously stirred (110).

A suitable pH monitoring system is used to monitor the alumina suspension to provide feedback for process control (112). The alumina suspension is preferably initially normalized to a pH of 7.0+/−0.1 prior to adding any of the Au—Pd solution (113). Preferably, the alumina suspension is initially normalized to a pH of 7.0+/−0.1 by adding a small amount of the Au—Pd solution, which is acidic. Alternatively, the alumina suspension may be initially normalized to a pH of 7.0+/−0.1 by adding a suitable acidic solution, such as weak nitric acid. It is appreciated that the step of initially normalizing the alumina suspension to a pH of 7.0+/−0.1 prior to adding any of the Au—Pd solution may not be necessary when the initial pH is between 7.0 and 7.5.

The alumina suspension is maintained at a pH of 7.0+/−0.1 during the process by coincidently adding the Au—Pd solution, which is acidic, and adding a suitable base solution, e.g., one containing $Na_2CO_3$ (sodium carbonate). The solution containing $Na_2CO_3$ is used to normalize the pH of the alumina suspension to a pH of 7.0+/−0.1 throughout the co-deposition portion of the process 100.

The Au—Pd solution is co-deposited on the alumina suspension under heating and stirring while adding the $Na_2CO_3$ solution to maintain the resulting solution at a pH of 7.0+/−0.1. This includes slowly adding the Au—Pd solution to the alumina suspension in a drop-wise manner and coincidently adding the $Na_2CO_3$ solution in a drop-wise manner while continuously stirring and maintaining the resulting solution at a temperature range of 45-60° C. (114). The pH of the resulting solution containing the alumina suspension with the co-deposited Au—Pd is monitored (116). A metered amount of the $Na_2CO_3$ solution is added coincident with adding the Au—Pd solution to maintain the resulting solution containing the alumina suspension with the co-deposited Au—Pd at a pH of 7.0+/−0.1 throughout the entire process (118). In this manner, gold and palladium are co-deposited onto alumina.

The resulting solution containing the alumina suspension with co-deposited Au—Pd is continuously heated to maintain a temperature of 45-60° C. and is continuously stirred for a suitable period of time, e.g., 30 minutes subsequent to adding a requisite amount of the Au—Pd solution (120).

The resulting solution containing the alumina suspension with co-deposited Au—Pd is allowed to stand to allow solids to precipitate out (122). Additional solids are separated from the resulting solution by decanting, filtering, drying and/or other suitable methods (124).

The solids are washed with $H_2O$ after being removed from the solution using a suitable washing process (126).

The precipitated solids are suitably dried, crushed, and calcined to form an Au—Pd/alumina catalyst in powder form (128). The Au—Pd/alumina catalyst is prepared as a washcoat that is applied to a substrate material for use as a catalyst in a catalytic converter (130).

One exemplary application includes a catalytic converter having target washcoat loading of 120 g/L with metal loading of 2.67 g/L (75.67 g/cu. ft.) including 1.79 g/L (50.67 g/cu. ft.) Pd and 0.88 g/L (25 g/cu. ft.) Au.

The catalyst prepared by the pH-normalized co-deposition and precipitation process 100 described with reference to FIG. 1 may be applied to a suitable substrate element for use in an exhaust gas feedstream of an internal combustion engine.

The catalyst prepared by the pH-normalized co-deposition and precipitation process 100 described with reference to FIG. 1 demonstrates the following properties that are described with reference to FIGS. 2, 3, and 4.

Figure 2:
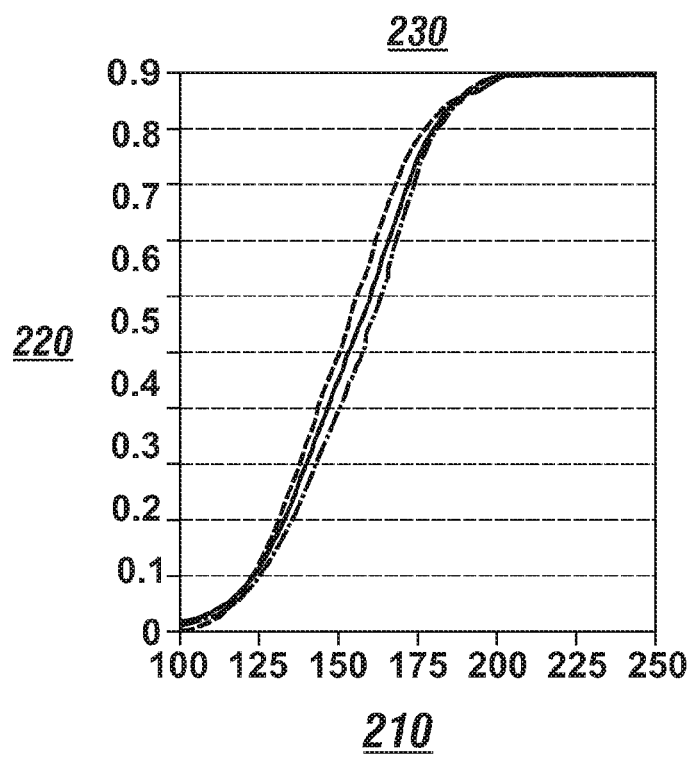
FIGS. 2, 3, and 4 graphically show data from exposing substrate samples washcoated with an Au—Pd/alumina catalyst prepared by the pH-normalized co-deposition and precipitation process described with reference to FIG. 1, including results for conversion efficiency (%) for CO, $C_3H_6$, and heavy HC, in accordance with the disclosure.
Figure 3:
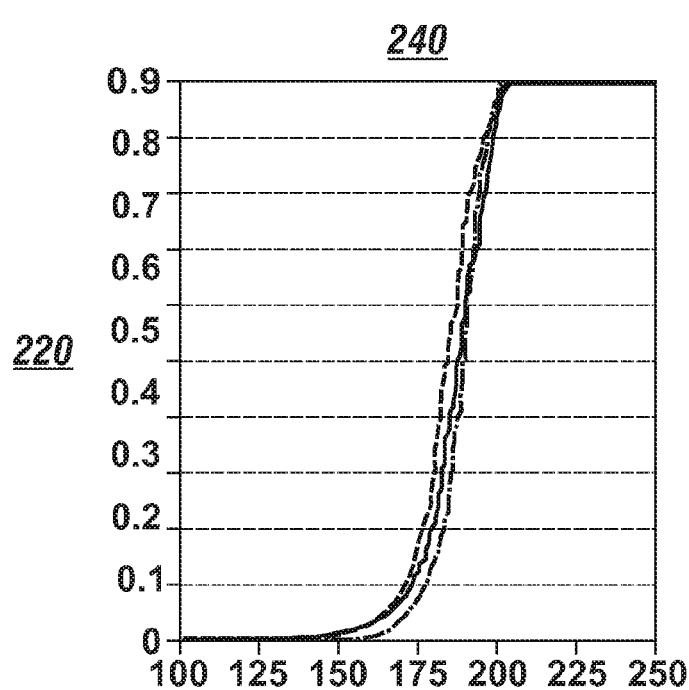
Figure 4:
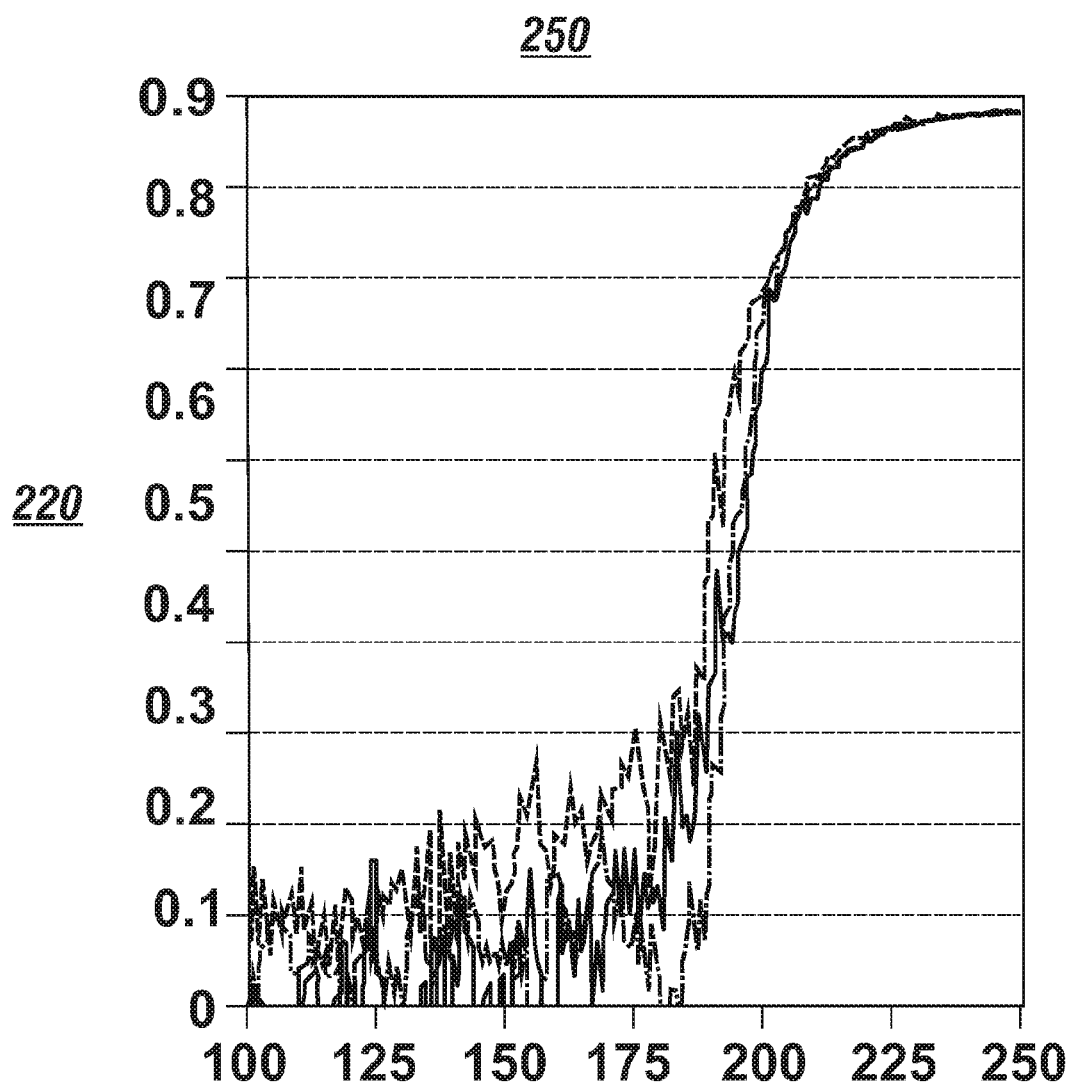

FIGS. 2, 3, and 4 are datagraphs each showing inlet temperature (° C.) on the x-axis (210) and conversion efficiency (%) on the y-axis (220). The depicted data shows results from exposing substrate samples washcoated with an Au—Pd/alumina catalyst prepared by the pH-normalized co-deposition and precipitation process 100 described with reference to FIG. 1. The coated substrate samples were prepared with an Au:Pd wt. ratio of 1:2 at a metal loading of 2.67 g/L (75.67 g/cu. ft.).

The coated substrate samples were exposed to a gas feedstream including 200 ppm NO, 500 ppm CO, 1050 ppm C3H6 and C3H8 (C1 basis), 2000 ppm n-dodecane and m-xylene (C1 basis) (heavy HC), 8% O2, 8% H2O at a space-velocity flowrate of $30,000^{-1}$. The depicted data is for three separately prepared substrate samples.

FIG. 2 depicts results for conversion efficiency (%) for CO (230) in the feedstream, and indicates a CO light-off efficiency (50% conversion efficiency) at a temperature range between 150° C. and 160° C. for the three separately prepared substrate samples.

FIG. 3 depicts results for conversion efficiency (%) for C3H6 (240) in the feedstream, and indicates a C3H6 light-off efficiency (50% conversion efficiency) at a temperature range between 180° C. and 190° C. for the three separately prepared substrate samples.

FIG. 4 depicts results for conversion efficiency (%) for the heavy HC (250) in the feedstream, and indicates a heavy HC light-off efficiency (50% conversion efficiency) at a temperature range between 190° C. and 200° C. for the three separately prepared substrate samples.

The results depicted in FIGS. 2, 3, and 4 indicate that the Au—Pd/alumina catalyst prepared by the pH-normalized co-deposition and precipitation process 100 described with reference to FIG. 1 oxidizes hydrocarbons and carbon monoxide in a low temperature environment, e.g., an exhaust gas feedstream of a lean-burn spark-ignition engine or a compression-ignition engine. Such low-temperature activity for CO/HC oxidation may provide suitable cold start emissions performance for lean-burn spark-ignition engines or compression-ignition engines.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:
1. Method for preparing a catalyst, comprising:
preparing a first solution comprising a gold precursor and a palladium precursor;
preparing an alumina suspension;
heating the alumina suspension to a preferred temperature range between 45° C. and 60° C.;
normalizing the pH of the alumina suspension comprising adjusting the pH of the alumina suspension to a pH of 7.0+/−0.1 prior to introducing the first solution to the alumina suspension;

introducing the first solution to the alumina suspension and coincidentally introducing sodium carbonate to the alumina suspension to maintain the pH of the resulting solution at a preferred pH level of 7.0+/−0.1 and maintaining temperature of the resulting solution between 45° C. and 60° C.;

separating solids in the resulting solution; and calcining the separated solids to form a catalyst including gold and palladium co-deposited onto alumina.

2. The method of claim 1, wherein normalizing the pH of the alumina suspension prior to introducing the first solution to the alumina suspension comprises adding nitric acid to the alumina suspension prior to introducing the first solution to the alumina suspension.

3. The method of claim 1, wherein preparing the first solution comprising the gold precursor and the palladium precursor comprises:

preparing the gold precursor comprising a solution including $HAuCl_4*3H_2O$;

preparing the palladium precursor comprising a solution including $Pd(NO_3)_2$ in nitric acid; and combining the gold precursor and the palladium precursor.

4. The method of claim 3, wherein combining the gold precursor and the palladium precursor comprises combining the gold precursor and the palladium precursor at a 2:1 Pd:Au wt. ratio.

5. The method of claim 4, wherein combining the gold precursor and the palladium precursor at the 2:1 Pd:Au wt, ratio comprises preparing a solution containing 1.492 wt % Pd and 0.736 wt % Au at the 2:1 Pd:Au wt. ratio.

6. The method of claim 3, wherein preparing the gold precursor comprising the solution including $HAuCl_4*3H_2O$ further comprises adding water to the gold precursor such that the solution including $HAuCl_4*3H_2O$ comprises 1% mass wt. of the first solution.

7. The method of claim 1, wherein introducing the first solution to the alumina suspension comprises introducing the first solution to the alumina suspension in a drop-wise manner.

8. Method for preparing a catalyst, comprising:

preparing a Au—Pd solution, including
    preparing a Au precursor,
    preparing a Pd precursor, and
    combining the Au precursor and the Pd precursor at a 2:1 Pd:Au wt. ratio;

adding the Au—Pd solution to a continuously stirred alumina suspension while maintaining a resulting solution within a preferred temperature range and at a pH of 7.0+/−0.1 including normalizing the pH of the alumina suspension to a pH of 7.0+/−0.1 prior to adding the Au—Pd solution to the alumina suspension;

separating solids in the resulting solution; and calcining the separated solids;

wherein adding the Au—Pd solution to the continuously stirred alumina suspension while maintaining the resulting solution within the preferred temperature range and at the pH of 7.0+/−0.1 comprises coincidentally adding the Au—Pd solution in a drop-wise manner and adding sodium carbonate in a drop-wise manner; and wherein adding the Au—Pd solution to the continuously stirred alumina suspension while maintaining the resulting solution within the preferred temperature range and at the pH of 7.0+/−0.1 comprises maintaining the resulting solution within a temperature range between 45° C. and 60° C.

9. The method of claim 8, wherein normalizing the pH of the alumina suspension to a pH of 7.0+/−0.1 prior to adding the Au—Pd solution to the alumina suspension comprises adding nitric acid to the alumina suspension.

10. The method of claim 8, wherein preparing the Au precursor comprises preparing a solution including $HAuCl_4*3H_2O$.

11. The method of claim 8, wherein preparing the Pd precursor comprises preparing a solution including $Pd(NO_3)_2$ in nitric acid.

* * * * *